United States Patent
Simeon et al.

(10) Patent No.: US 9,919,801 B2
(45) Date of Patent: Mar. 20, 2018

(54) ARTICULATING FOOT WELL DIVIDER FOR ADJACENT PARALLEL PASSENGER SEATS

(71) Applicant: B/E Aerospace, Inc., Wellington, FL (US)

(72) Inventors: Jayson C. Simeon, Round Rock, TX (US); Nathan E. Careless, Round Rock, TX (US); Steven K. Brown, Austin, TX (US); Nathan P. Wang, Austin, TX (US); Mark W. Foohey, Austin, TX (US); Heather D. Benoit, Austin, TX (US); Daniel J. Yee, Austin, TX (US); Jens P. Johnson, Austin, TX (US); Terry L. Branson, Austin, TX (US)

(73) Assignee: B/E Aerospace, Inc., Wellington, FL (US)

( * ) Notice: Subject to any disclaimer, the term of this patent is extended or adjusted under 35 U.S.C. 154(b) by 151 days.

(21) Appl. No.: 15/095,216

(22) Filed: Apr. 11, 2016

(65) Prior Publication Data
US 2016/0297531 A1 Oct. 13, 2016

Related U.S. Application Data

(60) Provisional application No. 62/145,665, filed on Apr. 10, 2015.

(51) Int. Cl.
*B64D 11/06* (2006.01)

(52) U.S. Cl.
CPC ...... *B64D 11/0606* (2014.12); *B64D 11/0602* (2014.12)

(58) Field of Classification Search
CPC .............................. B64D 11/0606; B60N 2/44
See application file for complete search history.

(56) References Cited

U.S. PATENT DOCUMENTS

| 6,142,574 A * | 11/2000 | Alexander | B60N 2/2839 297/188.2 |
| 2007/0085389 A1* | 4/2007 | Schurg | B64D 11/06 297/184.1 |
| 2007/0246981 A1 | 10/2007 | Plant | |

(Continued)

FOREIGN PATENT DOCUMENTS

WO 2006131636 A1 12/2006

OTHER PUBLICATIONS

International Search Report and Written Opinion of corresponding International Application No. PCT/US2016/026868; dated Jun. 23, 2016; 13 pages.

*Primary Examiner* — Richard G Davis
(74) *Attorney, Agent, or Firm* — Shumaker, Loop & Kendrick, LLP

(57) ABSTRACT

Disclosed is a foot well divider for adjacent parallel passenger seats, having a movable structure adapted to be hinged to a static structure positioned between first and second adjacent parallel passenger suites, the movable structure configured to pivot between a first position separating foot well space of the first suite from foot well space of the second suite, and a second position connecting the foot well spaces of the first and second suites. In certain aspects, the movable structure is a foot well divider in an aircraft foot well.

14 Claims, 2 Drawing Sheets

(56) References Cited

U.S. PATENT DOCUMENTS

2012/0298798 A1* 11/2012 Henshaw ............... B64D 11/06
                                                    244/118.6
2014/0123571 A1* 5/2014 Swain ................ B64D 11/0023
                                                    52/79.1

* cited by examiner

ARTICULATING FOOT WELL DIVIDER FOR ADJACENT PARALLEL PASSENGER SEATS

CROSS REFERENCE TO RELATED APPLICATION

This U.S. Non-Provisional Patent Application claims priority from U.S. Provisional Patent Application No. 62/145,665 filed on Apr. 10, 2015, the entirety of which is incorporated herein by reference.

TECHNICAL FIELD AND BACKGROUND OF THE INVENTION

The present invention relates generally to premium class aircraft passenger seating arrangements and seat privacy, and more particularly, to a seating arrangement including a stowable foot-well partition that divides foot-wells between two laterally adjacent seats.

Premium passenger seating arrangements in an aircraft can take the form of individual suites separated and defined by privacy walls and partitions. Such suites typically include a passenger living area outfitted with comfort, luxury and convenience features such as lie-flat adjustable seats, desks, advanced media and electronics, closets and various storage compartments, among other amenities.

With the development of passenger suites, there is a continuing effort to offer better features and amenities to passengers to further accommodate their needs and increase the level of luxury of such suites. To meet the expectations of passengers while maximizing the use of space and minimizing complexity, provided herein are novel passenger seating arrangements and amenity configurations wherein amenities are arranged to serve specific functions.

BRIEF SUMMARY OF THE INVENTION

Therefore, it is an object of the invention to provide a footwell divider for separating footwells between two adjacent seats for the purposes of providing additional privacy and to further accommodate ones personal needs. The footwell divider may serve as a privacy partition for selectively connecting or separating footwells in adjacent passenger seats, and may be provided in a passenger suite cabin layout having a plurality of nesting suites including, but not limited to, a seating group including both longitudinally adjacent and laterally adjacent passenger suites. In certain aspects, the footwell divider can be at least partly opened to allow adjacent passengers to converse and interact when desired.

To achieve the foregoing and other objects and advantages, in a first embodiment, disclosed is a foot well divider for adjacent parallel passenger seats including a movable structure adapted to be hinged to a static structure positioned between first and second adjacent parallel passenger suites, the movable structure configured to pivot between a first position separating foot well space of the first suite from foot well space of the second suite, and a second position connecting the foot well spaces of the first and second suites.

In certain aspects, the movable structure includes first and second panels each independently hinged to the static structure, the first panel configured to pivot between a first position oriented parallel to a longitudinal axis of the first suite and a second position oriented at an angle to the longitudinal axis of the first suite, and the second panel configured to pivot between a first position oriented parallel to a longitudinal axis of the second suite and a second position oriented at an angle to the longitudinal axis of the second suite.

In certain aspects, the first and second panels are parallel when the first panel is in the first position and the second panel is in the first position.

In certain aspects, the first and second panels pivot apart as the first and second panels pivot toward their respective second position.

In certain aspects, each of the first and second panels includes a vertically extending partition wall and an outboard pocket for stowing personal items such as books, tablets, etc.

In certain aspects, the first panel is positioned forward of a first seat within the first passenger suite, and the second panel is positioned forward of a second seat within the second passenger suite.

In certain aspects, the first and second seats are laterally adjacent, parallel and face in a common direction.

In yet other aspects, the movable structure comprise a single partition wall having an outboard pocket located on opposing sides of the partition wall.

In each of the above aspects, the well divider is or may be an aircraft footwell divider.

Also disclosed is a passenger suite seating arrangement, including first and second laterally adjacent and parallel passenger seats facing in a common direction; and a movable structure adapted to be hinged to a static structure positioned between the first and second laterally adjacent and parallel passenger seats, the movable structure configured to pivot between a first position separating foot well space forward of the first seat from foot well space forward of the second seat, and a second position connecting the foot well spaces forward of the first and second seats.

In certain aspects, the movable structure of the passenger suite seating arrangement includes first and second panels each independently hinged to the static structure, the first panel configured to pivot between a first position oriented parallel to a longitudinal axis of the first suite and a second position oriented at an angle to the longitudinal axis of the first suite, and the second panel configured to pivot between a first position oriented parallel to a longitudinal axis of the second suite and a second position oriented at an angle to the longitudinal axis of the second suite.

In certain aspects, the first and second panels of the passenger suite are parallel when the first panel is in the first position and the second panel is in the first position.

In certain aspects, the first and second panels of the passenger suite pivot apart as the first and second panels pivot toward their respective second position.

In certain aspects, wherein each of the first and second panels of the passenger suite includes a vertically extending partition wall and an outboard pocket.

In certain aspects, wherein the first panel of the passenger suite is positioned forward of a first seat within the first passenger suite, and the second panel is positioned forward of a second seat within the second passenger suite.

In certain aspects, the first and second seats are laterally adjacent, parallel and face in a common direction.

In certain aspects, the movable structure comprise a single partition wall having an outboard pocket located on opposing sides of the partition wall.

In each of the above aspects, the well divider is or may be an aircraft footwell divider.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, provided herein are various embodiments of passenger suite seating arrangements, for example, for installation within an aircraft or other conveyance. The term "suite" as used herein includes individual passenger living compartments or living spaces generally including adjustable seat(s), working surfaces, tray tables, video equipment, etc. Each suite may have its own entrance accessible from an aisle. Suites may be divided and separated by one or more of removable or permanently fixed partitions, shared structures, privacy walls, etc. Directions and offsets are generally described herein with reference to the longitudinal axis of the aircraft or conveyance, wherein the "longitudinal direction" is intended to be along the length of the aircraft and the "lateral" direction is intended to be in the direction perpendicular to the longitudinal axis of the aircraft.

As shown throughout the figures, the suites are arranged with their length parallel to the longitudinal axis of the aircraft, and thus parallel to the aisles. The suites may have a longer length than width to accommodate, for example, the length of a lie-flat adjustable seat when fully reclined to form a horizontal bed surface (not shown). The seats within the suites maybe arranged with their longitudinal axis generally parallel to the longitudinal axis of the aircraft. Suites may be arranged in any group including any number of suites. For example, suites may be arranged end-to-end to form columns of alternating fore and aft facing suites. Columns may flanked on either side by aisles, by an aisle on one side and a column of similar or dissimilar suites on the other side, or by columns on both sides so long as an entrance to each suite is provided. Suites may have varying lengths and widths to accommodate the furniture and amenities provided therein.

Figure 1:
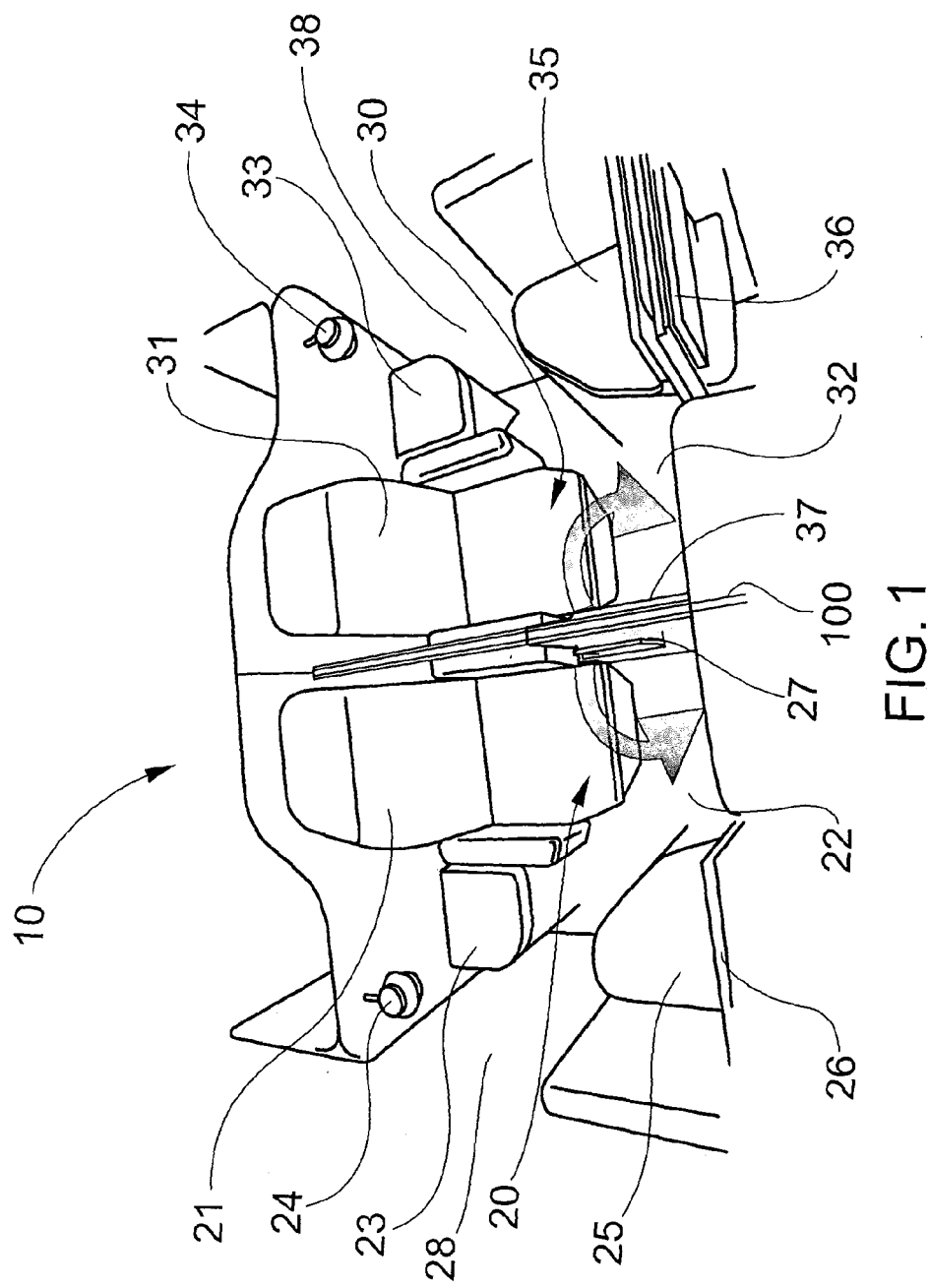
FIG. 1 is an overhead perspective view of a passenger suite seating arrangement according to an embodiment of the invention.

FIG. 1 depicts an aircraft passenger seating arrangement 10 including a first passenger suite 20 having a first seat 21 and a first foot well 22; and a second passenger suite 30 having a second seat 31 and a second foot well 32. The seats 21, 31 are preferably configured to adjust between an upright sitting position and a lie-flat sleeping position (not shown). As shown in FIG. 1, the first and second passenger suites 20, 30 may be symmetrically arranged as a mirror image relative to one another. For example, second seat 31 may be laterally adjacent to and facing the same direction as the first seat 21 along the longitudinal axis of the aircraft.

Each suite 20, 30 may include a table 23, 33 laterally adjacent to the seat 21, 31 and aisle, lighting arranged 24, 34, for example, above the table, a storage compartment 25, 35, working surfaces (not shown), tray tables (not shown), video equipment 26, 36, a stowable foot well divider 100, 201, 301 that partitions the first suite from the second suite, and an entrance 28, 38 for entering and exiting the suite that is accessed by a laterally adjacent aisle. In certain aspects, each entrance 28, 38 may further include a door or partition (not shown) separating the suite from the laterally adjacent aisle.

Suites 20, 30 may have an aisle that connects the first suite 20 to the second suite 30. This feature may be desirable by allowing ones traveling together to potentially occupy more continuous space within the aircraft. However, if privacy is desired between the two suites 20, 30, a stowable foot well divider 101, 201, 301 may be positioned between the first suite 20 and second suite 30 to partition each suite.

The stowable foot well divider 101, 201, 301 may include various shapes and dimensions for partitioning one suite from another suite. The stowable foot well divider further preferably includes storage compartments 27, 37 formed thereon for storing a passenger's personal items including, but not limited to, books and electronic items such as laptops and/or tablets. The storage compartments 27, 37 may include retractable elastic or inelastic pockets. In certain aspects, the stowable foot well divider may be a single removable panel or a plurality of panels that can be securely positioned, for example, via a locking mechanism or snap fit feature, or the stowable foot well divider may be a single pivoting panel 101 or a plurality of pivoting panel(s) 201, 301 that divide(s), for example, first foot well 22 from the second foot well 32.

Figure 2:
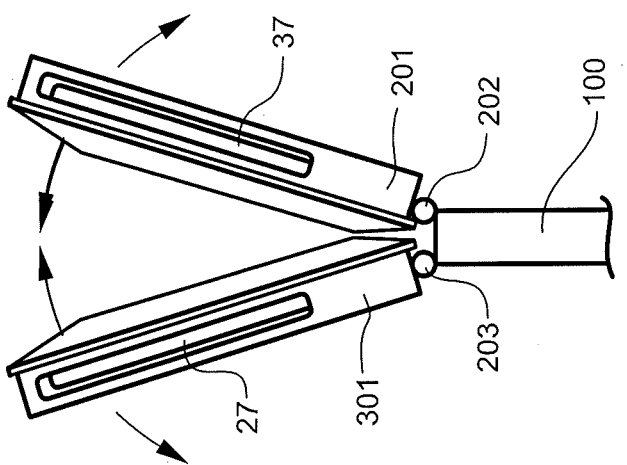
FIG. 2 depicts a top plan view according to one embodiment of the invention in which articulating panels (footwell dividers) that are independently hinged to a static structure and are adapted to deploy thereby separating foot wells between adjacent seats.

In certain aspects, the stowable foot well divider may further include two separate removable partitions, or as shown in FIGS. 1 and 2, the stowable foot well divider 201, 301 may include two separate partitions that are hingedly attached to a static structure 100 positioned between each respective suite 20, 30. In this aspect, stowable foot well divider 201, 301 may each be independently attached to static structure 100 via spaced apart hinges 202, 203 that are parallel and extend along the longitudinal axis of static structure 100. As further shown in FIG. 2, these hingedly attached stowable foot well dividers 201, 301 are preferably arranged to selectively pivot about parallel axes in the same and opposite directions relative to each other. For example, as shown in FIG. 1, the pivot axis may be perpendicular to the longitudinal axis of the aircraft and allows the stowable well divider 201, 301 to be deployed from a stowed position in which stowable well dividers 201, 301 are coplanar relative to each other and perpendicular to the longitudinal axis of the aircraft into an intermediately deployed position as shown in FIG. 2 and/or into a fully deployed position as shown in FIG. 1, thus separating each suite. As further shown in FIG. 1, stowable foot well dividers 201, 301 partition/close the first suite 20 from the second suite 30 when one or more stowable foot well divider(s) 201, 301 are fully deployed. When fully deployed the stowable foot well dividers 201, 301 are coplanar with the aircraft's longitudinal axis. When in the above mentioned stowed position, one may easily walk through each passenger suite as desired.

Figure 3:
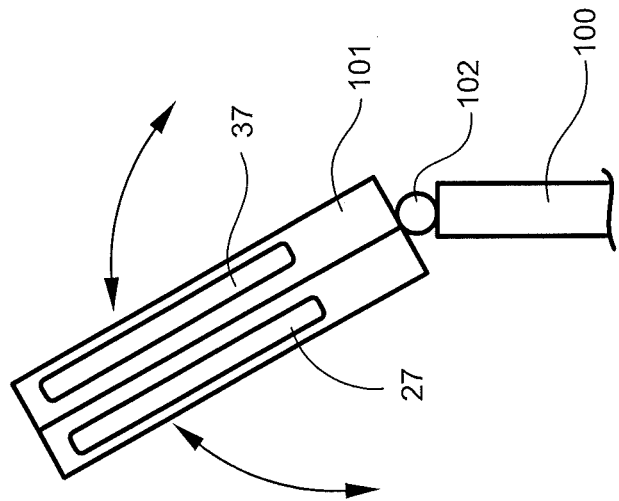
FIG. 3 depicts a top plan view according to another embodiment of the invention in which a single panel (footwell divider) is hinged to a static structure and adapted to deploy thereby separating foot wells between adjacent seats.

As further shown in FIG. 3, in certain embodiments, the stowable foot well divider 101 is a single partition that is hingedly attached to static structure 100 positioned between each respective suite 20, 30 that is configured to pivot about either suite for stowing in front of either seat 21, 31. In this aspect, hinge 102 of the stowable foot well divider 101 extends along the longitudinal axis of static structure 100. As further shown in FIG. 3, stowable foot well divider 101 is configured to selectively pivot. For example, as shown in FIG. 1 in view of FIG. 3, the pivot axis may be perpendicular to the longitudinal axis of the aircraft and allows the stowable well divider 101 to be deployed from a stowed position in which stowable well divider 101 is perpendicular to the aircraft's longitudinal axis into an intermediate deployed position as shown in FIG. 3 and/or into a fully deployed position as shown in FIG. 1. As further shown in FIG. 1, stowable foot well divider 101 partitions/closes the first suite 20 from the second suite 30 when stowable foot well divider 101 is fully deployed. When fully deployed the stowable foot well divider 101 is coplanar with the aircraft's longitudinal axis. When in the above mentioned stowed position, one may easily walk through each passenger suite as desired.

The stowable foot well divider 101, 201, 301 disclosed herein is preferably formed of a rigid material including, but not limited to, decorative wood, wood upholstered with cloth, leather, or a combination thereof, a rigid thermoplastic (e.g., an injection molded thermoplastic resin), or any combination thereof. The stowable foot well divider 101, 201, 301 may further include storage compartments 27, 37, including, elastic or inelastic pockets, drawers, or any combination thereof.

As alluded to above, the disclosed seating arrangement 10 and stowable footwell divider 101, 201, 301 maximizes the use of space within an aircraft while minimizing overall complexity of suite design.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A foot well divider for adjacent parallel passenger seats, comprising:
    a movable structure adapted to be hinged to a static structure positioned between first and second adjacent parallel passenger suites, the movable structure configured to pivot between a first position separating foot well space of the first suite from foot well space of the second suite, and a second position connecting the foot well spaces of the first and second suites, wherein:
    the movable structure comprises first and second panels each independently hinged to the static structure, the first panel configured to pivot between a first position oriented parallel to a longitudinal axis of the first suite and a second position oriented at an angle to the longitudinal axis of the first suite, and the second panel configured to pivot between a first position oriented parallel to a longitudinal axis of the second suite and a second position oriented at an angle to the longitudinal axis of the second suite.

2. The foot well divider according to claim 1, wherein the first and second panels are parallel when the first panel is in the first position and the second panel is in the first position.

3. The foot well divider according to claim 1, wherein the first and second panels pivot apart as the first and second panels pivot toward their respective second position.

4. The foot well divider according to claim 1, wherein each of the first and second panels comprises a vertically extending partition wall and an outboard pocket.

5. The foot well divider according to claim 1, wherein the first panel is positioned forward of a first seat within the first passenger suite, and the second panel is positioned forward of a second seat within the second passenger suite.

6. The foot well divider according to claim 5, wherein the first and second seats are laterally adjacent, parallel and face in a common direction.

7. The foot well divider according to claim 1, wherein the movable structure comprises a single partition wall having an outboard pocket located on opposing sides of the partition wall, and wherein the foot well divider is an aircraft footwell divider.

8. A passenger suite seating arrangement, comprising:
    first and second laterally adjacent and parallel passenger seats facing in a common direction; and
    a movable structure adapted to be hinged to a static structure positioned between the first and second laterally adjacent and parallel passenger seats, the movable structure configured to pivot between a first position separating foot well space forward of the first seat from foot well space forward of the second seat, and a second position connecting the foot well spaces forward of the first and second seats, wherein:
    the movable structure comprises first and second panels each independently hinged to the static structure, the first panel configured to pivot between a first position oriented parallel to a longitudinal axis of the first suite and a second position oriented at an angle to the longitudinal axis of the first suite, and the second panel configured to pivot between a first position oriented parallel to a longitudinal axis of the second suite and a second position oriented at an angle to the longitudinal axis of the second suite.

9. The passenger suite seating arrangement according to claim 8, wherein the first and second panels are parallel when the first panel is in the first position and the second panel is in the first position.

10. The passenger suite seating arrangement according to claim 8, wherein the first and second panels pivot apart as the first and second panels pivot toward their respective second position.

11. The passenger suite seating arrangement according to claim 8, wherein each of the first and second panels comprises a vertically extending partition wall and an outboard pocket.

12. The passenger suite seating arrangement according to claim 8, wherein the first panel is positioned forward of a first seat within the first passenger suite, and the second panel is positioned forward of a second seat within the second passenger suite.

13. The passenger suite seating arrangement according to claim 12, wherein the first and second seats are laterally adjacent, parallel and face in a common direction.

14. The passenger suite seating arrangement according to claim 8, wherein the movable structure comprises a single partition wall having an outboard pocket located on opposing sides of the partition wall.

* * * * *